(12) United States Patent
Wollanek et al.

(10) Patent No.: US 11,566,383 B2
(45) Date of Patent: Jan. 31, 2023

(54) SYSTEM AND METHOD OF SURVEYING A TRACK

(71) Applicant: PLASSER & THEURER EXPORT VON BAHNBAUMASCHINEN GESELLSCHAT M.B.H., Vienna (AT)

(72) Inventors: Samuel Wollanek, Pregarten (AT); Gerald Zauner, Wilhering (AT); Martin Buerger, Linz (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 1030 days.

(21) Appl. No.: 16/317,153

(22) PCT Filed: Jun. 14, 2017

(86) PCT No.: PCT/EP2017/000696
§ 371 (c)(1),
(2) Date: Jan. 11, 2019

(87) PCT Pub. No.: WO2018/010827
PCT Pub. Date: Jan. 18, 2018

(65) Prior Publication Data
US 2019/0257037 A1    Aug. 22, 2019

(30) Foreign Application Priority Data
Jul. 11, 2016  (AT) .................................. A 325/2016

(51) Int. Cl.
*E01B 35/12*  (2006.01)
*E01B 35/08*  (2006.01)
(Continued)

(52) U.S. Cl.
CPC ................ *E01B 35/08* (2013.01); *B61K 9/08* (2013.01); *B61L 23/047* (2013.01); *E01B 35/06* (2013.01);
(Continued)

(58) Field of Classification Search
None
See application file for complete search history.

(56) References Cited

U.S. PATENT DOCUMENTS 3,107,168 A  10/1963  Hogan et al.
3,381,626 A   5/1968  Fagan et al.
(Continued)

FOREIGN PATENT DOCUMENTS

AT     515208 A4    7/2015
DE    2001542 A1    7/1970
(Continued)

*Primary Examiner* — Eileen M Adams
(74) *Attorney, Agent, or Firm* — Laurence A. Greenberg; Werner H. Stemer; Ralph E. Locher

(57) ABSTRACT

A system for surveying a track includes two outer measuring devices and a central measuring device disposed therebetween, relative to the longitudinal direction of the track. Each measuring device has a specific position relative to the track in order to detect geometric track parameters. One outer measuring device includes a camera with a recording area in which a measuring object of the other outer measuring device and a measuring object of the central measuring device are disposed. The camera is connected to an evaluation device for pattern recognition. All of the position parameters of the track required for precise lining and levelling of the track are thus recorded by a single camera. A method of operating the system is also provided.

15 Claims, 3 Drawing Sheets

(51) Int. Cl.
  *E01B 35/06*   (2006.01)
  *B61K 9/08*    (2006.01)
  *G06V 10/22*   (2022.01)
  *G06V 10/40*   (2022.01)
  *G06V 10/24*   (2022.01)
  *B61L 23/04*   (2006.01)
  *G01B 11/00*   (2006.01)
  *E01B 27/16*   (2006.01)

(52) U.S. Cl.
  CPC .............. *E01B 35/12* (2013.01); *G01B 11/00* (2013.01); *G06V 10/22* (2022.01); *G06V 10/242* (2022.01); *G06V 10/40* (2022.01); *E01B 27/16* (2013.01); *E01B 2203/10* (2013.01)

(56) References Cited

U.S. PATENT DOCUMENTS

| | | | |
|---|---|---|---|
| 3,750,299 A | | 8/1973 | Plasser et al. |
| 5,598,782 A | * | 2/1997 | Wiseman ................ E01B 35/00 104/2 |
| 9,518,845 B2 | | 12/2016 | Lichtberger |
| 2014/0152814 A1 | * | 6/2014 | Farritor ................ G06V 10/147 348/142 |
| 2016/0161553 A1 | * | 6/2016 | Tamura .............. G01R 31/2891 324/750.23 |
| 2017/0131085 A1 | * | 5/2017 | Hillebrand ............ G06V 40/20 |

FOREIGN PATENT DOCUMENTS

| | | |
|---|---|---|
| EP | 2960371 A1 | 12/2015 |
| JP | S5356056 A | 5/1978 |

\* cited by examiner

SYSTEM AND METHOD OF SURVEYING A TRACK

FIELD OF TECHNOLOGY

The invention relates to a system for surveying a track, comprising—with regard to the longitudinal direction of the track—two outer measuring devices and a central measuring device arranged therebetween, wherein each measuring device has a specific position relative to the track in order to detect geometric track parameters. The invention further relates to a method of operating the system.

DESCRIPTION OF THE RELATED PRIOR ART

A track survey serves for detecting track position faults and for targeted execution of correcting measures. A system provided for this purpose determines geometric track parameters such as the position of the track in horizontal and vertical direction as well as the relative vertical position (super-elevation, twist) of the two rails of the track to one another.

In the case of tracks with ballast bed, lining and levelling are the essential corrective measures for producing a desired track position. By means of a lining system, the track is corrected as to its horizontal position. Vertical position faults of the track or the rails are rectified by means of a levelling system.

Track maintenance machines provided for this purpose comprise work units for bringing the track into the required position and for tamping the same. Thereafter, a dynamic track stabilization may take place by means of a vibration unit provided for this purpose in order to ensure a sustained position of the track in the ballast bed.

The so-called versine is used for lining the track. In this, serving as reference base as a rule is a measuring chord which is stretched in the track center between the two outer measuring devices of the afore-mentioned system. A feeler member of the central measuring device scans the thus-formed chord, yielding the versine at this point.

A simple vertical measurement of the two rails may take place via an inclination measurement of the particular measuring device, for example by an arrangement of pendulums. Such solutions, however, are too inaccurate for a precise levelling of the track.

Usually, a further measuring chord is arranged above each rail, the ends of which are coupled to the outer measuring devices via rod assemblies. With this, the vertical positions of the two outer measuring devices are transmitted to the respective measuring chord. A feeler member is provided at the central measuring device for each measuring chord. In this, as with the measuring chord in the track center, there is the difficulty of avoiding a collision of the measuring chords with the work units.

Known from the prior art are also systems for track surveying without measuring chords. For example, a measuring device disclosed in AT 515 208 A4 uses a machine frame of a track maintenance machine as reference base. Additionally, optical systems for track surveying have been known for some time, for instance from U.S. Pat. No. 3,107,168 A.

SUMMARY OF THE INVENTION

It is the object of the invention to indicate an improvement over the prior art for a system and a method of the type mentioned at the beginning.

According to the invention, this object is achieved by way of a system for surveying a track, comprising—with regard to the longitudinal direction of the track—two outer measuring devices and a central measuring device disposed therebetween, wherein each measuring device has a specific position relative to the track in order to detect geometric track parameters and this object is also achieved by a method of operating such a system. Advantageous further developments of the invention become apparent from the dependent claims.

In this, the one outer measuring device comprises a camera with a recording area, wherein a measuring object of the other outer measuring device and a measuring object of the central measuring device are arranged in the recording area, and wherein the camera is connected to an evaluation device for pattern recognition.

By means of pattern recognition, the measuring objects are recognized and the position thereof relative to one another and with respect to an image section of the camera is determined. In this way, all of the position parameters of the track required for precise lining and levelling are recorded by means of a single camera. In total, only a few system components are required to perform the track surveying. In addition, track parameters such as versine, longitudinal level of the respective rail, twist and rail gauge can be recorded redundantly.

A simple embodiment of the invention proposes that the measuring object of the other outer measuring device is designed as a light source, and that the measuring object of the central measuring device is designed as a shadowing object which shadows a part of the light source against the camera. Such measuring objects are simple and robust components which are resistant against shocks and dust formation. The shadowing object may be a simple structural component of the central measuring device which stands out as a characteristic silhouette against the light source.

In another embodiment, it is advantageous if both measuring objects are designed as shadowing objects, each shadowing a part of a light source against the camera. In this, each measuring object has a characteristic shape which can be reliably detected by means of pattern recognition. The light source serves as planar background illumination.

A further development of the invention provides that a further measuring object is arranged in the recording area of the camera. With this, a so-called four-point measurement is realized, by means of which depressions of the track can be identified in a simple manner. With a multitude of measuring objects, it is possible to determine additional position data of the track. In this, one of the measuring objects can be designed as a light source which is partly shadowed against the camera by the other measuring objects.

As a further practical complement, at least one measuring object comprises luminescent elements. This measure enables a simpler and quicker evaluation by means of pattern recognition under difficult environmental conditions. For example, two images of the measuring object are recorded one immediately after the other, wherein the illumination is only activated for one picture. The measuring object is then instantly recognizable in this picture.

It is further advantageous if at least one measuring object or the camera is designed to be displaceable and/or pivotable in a mount of the associated measuring device. On the one hand, this ensures that both measuring objects remain within the recording area of the camera even in tight curves of the track course. On the other hand, this makes possible a tracking by the camera or the measuring objects, so that the camera and the measuring objects remain on a common axis during travel in curves.

For a simple design of the system, it is useful if the measuring objects and the camera are each arranged on a measuring trolley mobile on the track. In this, the particular trolley is pressed against a rail, resulting in an unambiguous position of the measuring trolley relative to the track. Thus, the position of the track at the particular position of the measuring trolley is defined by the position of the latter.

In an advantageous embodiment it is provided that the system comprises a track maintenance machine on which the measuring devices are arranged. In this, it is merely necessary to make certain that there is visual contact between the camera and the measuring objects. Even if said visual contact is briefly interrupted by a work unit, the functionality of the system continues. This would be different, according to the prior art, in the case of a collision with a measuring chord.

It is favourable if the track maintenance machine is designed as a track tamping machine and if a measuring object for detecting a track correction is arranged in the region of a tamping unit. The camera is arranged at an outer measuring device and thus removed from the working units (tamping unit, lifting-lining unit) of the tamping machine. The central measuring object in the region of the working units can be designed as a simple shadowing object and is thus insensitive to vibrations and dust. For that reason, the central measuring object can also be arranged directly at the tamping unit where the track position fixed by tamping is to be measured.

In a further development of this system design, a position measuring system is associated with at least one measuring device, by means of which the position relative to the track can be determined. The measuring device can thus be designed contact-free with regard to the track. The evaluation of the camera recordings yields the position of the measuring devices relative to one another, and the evaluation of the position measuring system yields the position of the measuring devices equipped therewith with respect to the rails. From this, the track parameters to be detected are computed by coordinate transformation.

In the method, according to the invention, of operating an above-mentioned system it is provided that the system is moved along the track and that, during this, the changes in position of the measuring objects are determined by means of an evaluation of the images of the measuring objects recorded by means of the camera.

The evaluation of the recorded measuring objects takes place by means of pattern recognition, wherein the position of the recognized measuring objects is determined in each image. Via the known geometric relationships between the measuring devices, the various position parameters of the track are thus computed.

An advantageous further development of the method exists if a characteristic vibration frequency is specified for the system, and if for the camera a frame rate is specified which is at least double the characteristic vibration frequency. Such characteristic vibration frequencies occur during operation of a track maintenance machine, with system vibrations resulting therefrom. In an image sequence with a correspondingly high frame rate, such disturbances can be eliminated mathematically in a simple manner. Specifically, the system vibrations are detected in the process and subtracted.

Advantageously it is provided that at least one measuring object or the camera is displaced and/or swivelled during travel in a curve. For such tracking, a drive of the corresponding measuring device is controlled in dependence of an occurring curve radius of the track. For example, the two measuring objects and the camera are aligned with regard to one another along a common axis in order to determine the track positions at the measuring point by means of the lateral displacements required to that end.

Alternatively or in addition thereto, it may be useful if a pattern, affixed to a measuring object, is recorded by means of the camera, wherein the image of said pattern changes in a characteristic way when the position of the pattern changes. Then, lateral tracking is no longer necessary in curves since a displacement of the particular measuring object is determined by means of the changing recording of the pattern.

An advantageous further development of the method provides that a working unit of a track maintenance machine is controlled in dependence on the detected position of a measuring object. In a track tamping machine, for example, the track position is determined by means of a shadowing object in immediate proximity to the tamping unit. Depending therefrom and in ongoing comparison to a desired track position, the lifting-lining unit of the track tamping machine is controlled.

Additionally, it is advantageous if at least the position of one measuring object or the camera with respect to the track is detected in a contact-free manner by means of a position measuring system. With this, mechanical components prone to wear, such as running wheels of measuring trolleys, can be omitted. Even simple optical position measuring systems such as laser line scanners are suited for determining with sufficient precision the position of the particular measuring device relative to the rails.

BRIEF DESCRIPTION OF THE DRAWINGS

The invention will be described below by way of example with reference to the attached figures. There is shown in schematic representation in.

DESCRIPTION OF THE INVENTION

Figure 1:
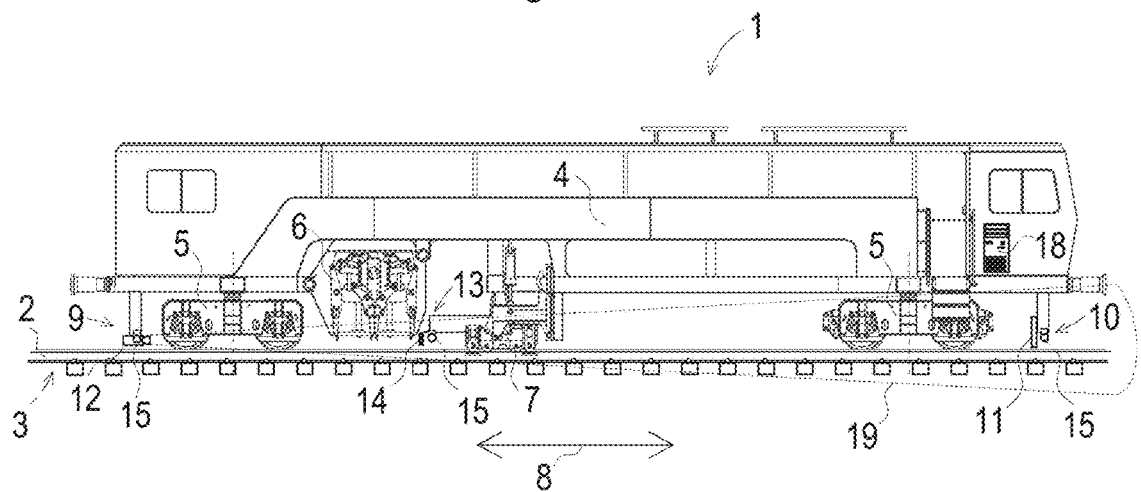
FIG. 1 a track maintenance machine in a side view

The track maintenance machine 1 in FIG. 1 is configured as a track tamping machine and mobile on rails 2 of a track 3. A machine frame 4 of the track maintenance machine 1 is supported on on-track undercarriages 5 and carries tamping units 6 and a lifting-lining unit 7 as working units. Other track maintenance machines, such as cleaning machines or dynamic track stabilizers, are also suited for the system according to the invention.

Two outer measuring devices 9 and 10, with respect to the longitudinal direction 8 of the track 3, are arranged on the track maintenance machine 1. The front measuring device 10, as seen in the working direction, comprises a measuring object 11 in the form of a flat light source. The luminous area of this light source faces a camera 12 which is attached on the rear measuring device 9.

Arranged between the two outer measuring devices 9, 10 is a central measuring device 13. Fastened to the latter in immediate proximity to the tamping unit 6 is a further measuring object 14. This is a geometrically characteristic extension which, as a shadowing object, covers a part of the light source against the camera 12. This is, for example, a rod or punched sheet metal. By means of the additional measuring object 14, the position of the track 3 at this point is detected so that the track position fixed here by means of the tamping units 6 can be adjusted to a prescribed target track position.

Figure 2:
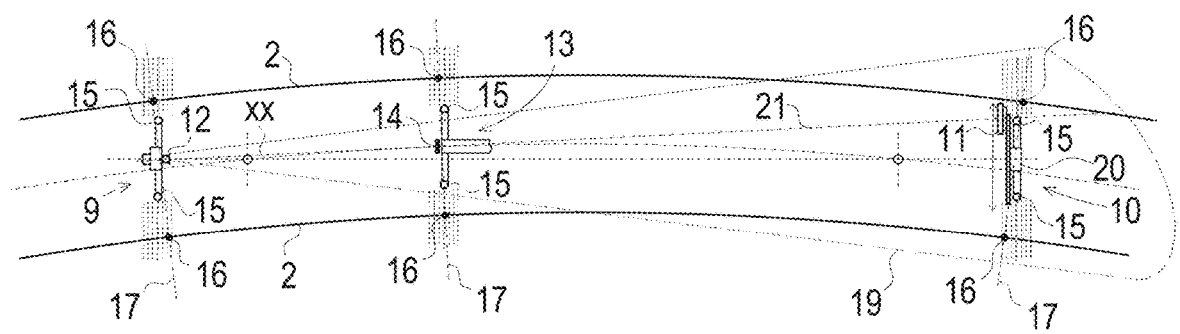
FIG. 2 measuring devices during curve travel in a top view

In the first example of embodiment, measuring devices 9, 10, 13 are shown which are designed contact-free with regard to the track 3 (FIGS. 1, 2). In this, each measuring device 9, 10, 13 comprises a position measuring system 15 for measuring the position of the rails 2 relative to the measuring devices 9, 10, 13. The respective position measuring system 15 comprises, for example, a laser line scanner or another known optoelectronic sensor for each rail 2.

With this, successive cross-sectional profiles of the respective rail 2 with reference to a coordinate system of the measuring device 9, 10, 13 are detected during forward travel of the track maintenance machine 1. From this, a position model of the particular rail 2 emerges by means of which the coordinates of defined measuring points 16 are determined. For each measuring device 9, 10, 13, the measuring points 16 are intersection points of a reference plane 17, extending perpendicularly to the rails 2, and the theoretical running edge of the respective rail 2 (at the inner contour 14 mm below the upper rail edge).

For computing the measuring point coordinates, the system comprises a computer as evaluation device 18 which is arranged in a control room of the track maintenance machine 1, for example, and connected via a bus system to the measuring devices 9, 10, 13. In this, synchronization times are prescribed which enable a chronological matching of the measuring results.

For computing the measuring point coordinates, the geometric relationships of the track maintenance machine 1 are used in addition to the measuring results. The evaluation is simplified if the measuring devices 9, 10, 13 are always aligned perpendicularly to the rails. In a simple manner, this takes place by arranging the outer measuring devices 9, 10 on a bogie frame of the respective undercarriage 5.

The camera 12 has a recording area 19 which is defined by camera parameters such as lens focal length and image sensor size. In addition, a selected lens aperture determines the depth of field within the recording area 19. The camera 12 is pointed in the direction of the two measuring objects 11, 14. These are thus arranged in the recording area 19 of the camera 12.

In FIG. 2, the three measuring devices 9, 10, 13 are shown during travel in a curve. In this embodiment, the rear and the central measuring device 9, 13 keep their position relative to the machine frame 4. The front measuring device 10 is designed to be laterally displaceable with respect to a mount 20, so that the two measuring objects 11, 14 remain aligned on a common axis 21 with respect to the camera 12. To that end, for example, a spindle drive is provided which tracks the outer measuring object 11 by means of regulating during curve travel. Alternatively, the measuring device 10 can also be displaceable with respect to the machine frame 4. The displacement path is used for computation of the coordinates of the measuring points 16.

Figure 3:
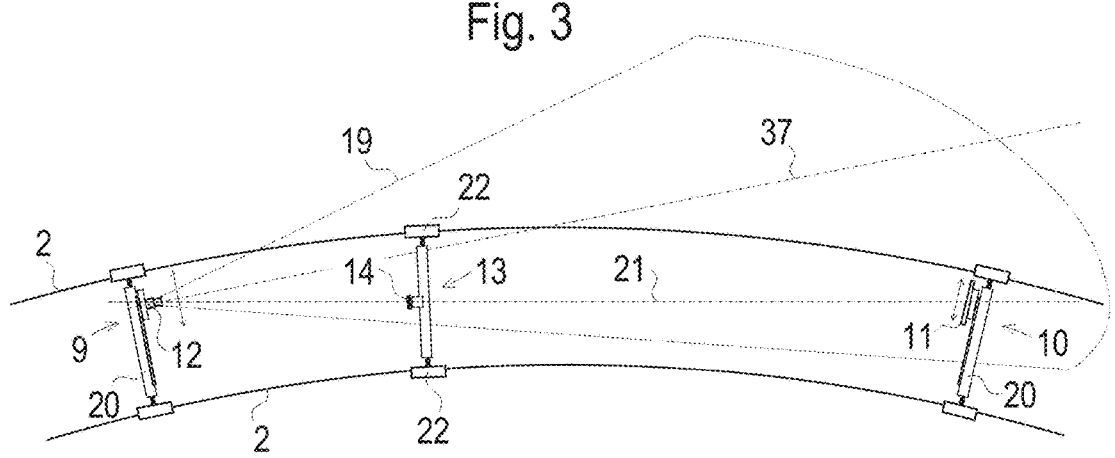
FIG. 3 arrangement with measuring trolley in curve travel

The position measuring system 15 can be omitted if the respective measuring device 9, 10, 13 is designed as a measuring trolley and guided on the track 3 by means of wheels 22 (FIG. 3). During this, the wheels 22 have to be pressed laterally against the rails 2, so that the respective measuring device 9, 10, 13 has a distinct position relative to the rails 2. In this case, the computation of the coordinates can be carried out in a simpler way since the evaluation of the position measuring system 15 is omitted. However, the maintenance expense increases as a result of the moving components.

For operation in tight curves, the camera 12 and the outer measuring object 11 are arranged to be laterally displaceable. Due to this controlled tracking, the two measuring objects 11, 14 and the camera 12 remain aligned on a common axis 21. To that end, the camera 12 and the outer measuring object 11 are each guided on a mount 20 and displaceable by means of an adjustment drive. In this embodiment, the measuring devices 9, 10, 13 are connected to the track maintenance machine 1 via a respective articulated suspension.

A targeted pivoting of the camera 12 can also be useful in order to keep the measuring objects 11, 14 in a central viewing axis 37. When computing the coordinates of the measuring points 16, the corresponding horizontal and/or vertical pivoting angle is then also taken into account. Otherwise it is sufficient to also include the detected displacement paths of the camera 12 or the measuring objects 11, 14 in the computation.

In FIGS. 4, 5, 7, 8, 11 and 12, examples of images 23 of the measuring objects 11, 14 taken by the camera 12 are shown. In this, the images 23 of FIGS. 4 and 5 result from a system arrangement according to FIG. 2. The images 23 are evaluated by means of pattern recognition. For this, suitable camera systems and software solutions have long been known.

The position of the recognized measuring objects 11, 14 is determined by means of specified reference systems. As a rule, a first reference system with an x-coordinate axis $x_0$, a y-coordinate axis $y_0$ and a coordinate origin $U_0$ is defined for the camera 12 in the image sensor plane. The coordinates of all recognized elements are referenced to this first reference system.

Separate reference systems are provided for the position measuring systems 15 for determining the positions of the measuring objects 11, 14 relative to the track 3. In particular, a second reference system with an x-coordinate axis $x_1$, a y-coordinate axis $y_1$ and a coordinate center $U_1$ is associated with the central measuring object 14 designed as a shadowing object. A third reference system having an x-coordinate axis $x_2$, a y-coordinate axis $y_2$ and a coordinate center $U_2$ is associated with the outer measuring object 14 designed as a light source.

The measuring points 16 on the rails 2 are first detected in the associated reference system by means of the respective position measuring system 15 and then transformed to the first reference system. During this, the z-coordinates of the measuring points 16 ensue also via the already known geometric relationships. For synchronization of the measuring results, a rail model formed by means of the position measuring systems 15 is used. This requirement is omitted if the measuring devices 9, 10, 13 are always aligned perpendicularly to the rails 2 and all measuring points 16 can be detected simultaneously.

In any case, a relative or absolute allocation of the measuring points 16 to geo-coordinates of the track 3 is useful. In this, the measuring point coordinates detected in the first reference system are transformed to a super-ordinate coordinate system of the track maintenance machine 1 or the track 3. This super-ordinate coordinate system is defined in a known manner by means of an inertial measuring system, by means of a GNSS system and/or by means of fixed points mounted next to the track.

Figure 4:
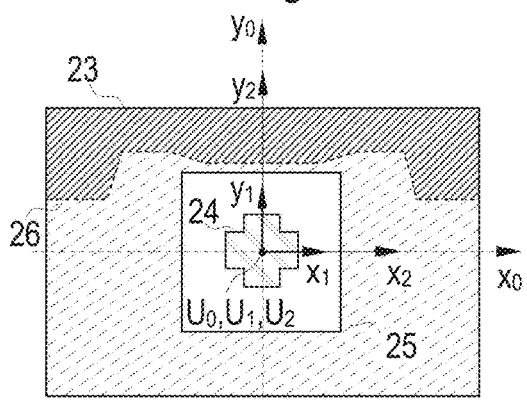
FIG. 4 image of the measuring objects

The image 23 in FIG. 4 results if the measuring devices 9, 10, 13 are arranged on a straight, level track 3 without twist. Then, the silhouette 24, arising from the shadowing, of the central measuring point 14 lies centered over the light surface 25 which is formed by the front measuring object 11. This is an example of an adjustment for an initial position. The silhouette 24 and the light surface 25 can be evaluated as geometric shapes in the image by means of pattern recognition. To that end, as a rule, corner points or intersection points of edges of shapes and defined evaluation lines are recognized and set in relation to one another.

Figure 5:
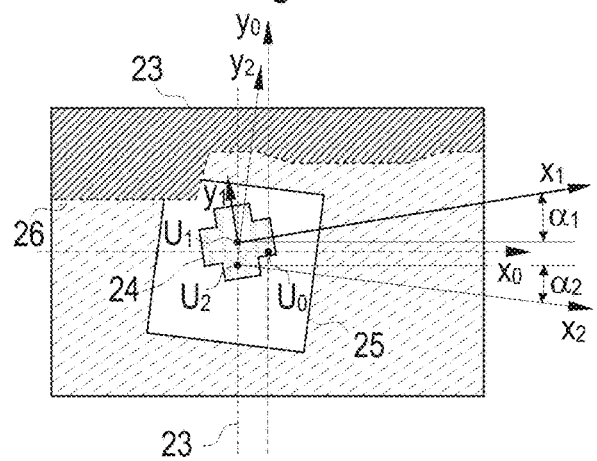
FIG. 5 image with position change of the measuring objects

The recognizability of the measuring objects 11, 14 is facilitated if these include redundant elements. This is obvious in the case of the silhouette 24, produced by means of a cross-shaped shadowing object, with its 12 geometrically arranged corner points. But also the square light surface 25 remains recognizable if a corner is hidden, for example, by dust or by an obstacle 26 (FIG. 5). Such an obstacle 26 may be, for example, an undercarriage 5 which, in a curve, pushes itself partially between the camera 12 and the measuring object 11.

Travel in a curve results in an image 23 according to FIG. 5. In this, there is usually a twisting and displacement of the measuring devices 9, 10, 13 relative to one another. The twisting is caused by super-elevations or ramps in the track 3 which are detected by the present system. For determination of the lateral displacement, the light surface 25 of the outer measuring object 10 is tracked laterally so that the center points of the light surface 25 and the silhouette 24 are always on a common vertical axis 26. In this, the distance between this axis 26 and the y-axis $y_0$ of the first reference system indicates the lateral displacement of the central measuring object 14. The lateral displacement of the front measuring object 11 additionally results from the displacement path of this measuring object 11 relative to the mount 20.

For determination of the twist, a tilt of the light surface 25 or the silhouette 24 is evaluated. First, a first tilt angle $\alpha_1$ is recorded about which the silhouette 24 is tilted in the image 23. A second tilt angle $\alpha_2$ indicates the amount of tilt of the light surface 25 in the image 23. Additionally, the measuring results of the position measuring systems 15 are evaluated. From this, the twist values of the track 3 are computed by means of the evaluation device 18.

The vertical positions of the track 3 and the two rails 2 are also detected by evaluation of the positions of the light surface 25 and the silhouette 24 in the images 23 as well as the position machine frame system 15. In particular, the displacements of the measuring objects 11, 14 in the y-direction and the transformed coordinates of the measuring points 16 yield the vertical level values for the rails 2. If the respective measuring device 9, 10, 13 is a measuring trolley guided on the rails, then the level values are determined from the displacement values and tilt values of the measuring objects 11, 14.

Figure 6:
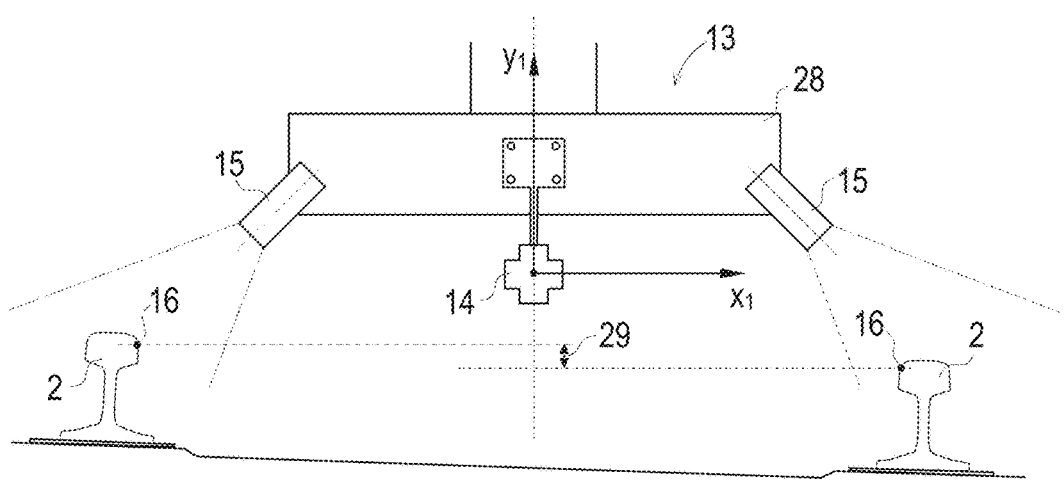
FIG. 6 central measuring device

Shown in FIG. 6 is the central measuring device 13 in a front view. This measuring device 13 is favourably connected to the lifting-lining unit 7 or to a tamping unit frame. In this manner, the measuring device 13 follows the lateral movement during travel in a curve, or a shifting of the track by means of the lifting-lining unit 7.

The measuring device 13 is designed contact-less with regard to the rails 2 and therefore comprises a position measuring system 15. In this, a laser line scanner is directed at each rail, for example, in order to detect the position coordinates of measuring points 16 in the reference system of the measuring device 13. Favourably, the origin of this reference system is the center point of the measuring object 14 which is mounted on a transverse beam 28 of the measuring device 13.

By evaluation of the measuring results of the position measuring system 15 and the above-described position determination of the measuring object 14 relative to the camera 12, the super-elevation 29 of the outer rail 2 versus the inner rail 2 is determined.

Figure 7:
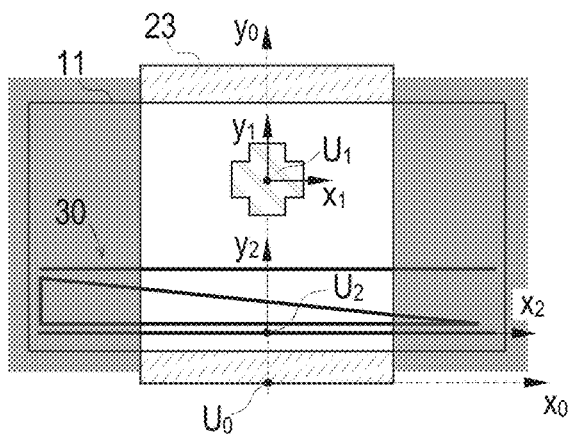
FIG. 7 image of the measuring objects with position-dependent pattern
Figure 8:
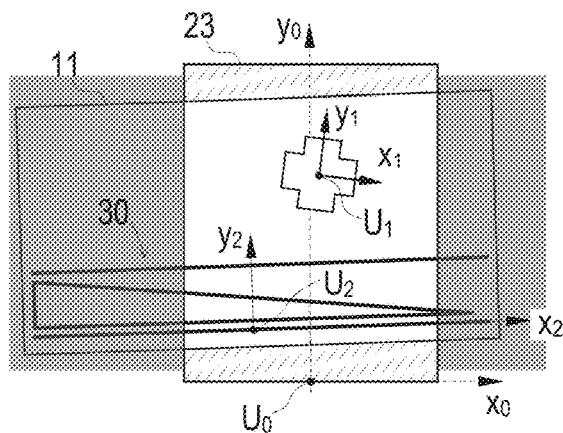
FIG. 8 image with position change of the measuring objects with position-dependent pattern FIG. 9 pattern recognition of a position-dependent pattern FIG. 10 position-dependent pattern with detected position change FIG. 11 image of two shadowing objects in front of a light source FIG. 12 image with position change of the shadowing objects

A tracking of the outer measuring object 11 for determining the lateral displacement can be omitted if a characteristic pattern 30 is attached to the measuring object 11. Corresponding images 23 are shown in FIGS. 7 and 8. In this, for example, the y-axis $y_0$ of the first reference system forms an evaluation line 31 by means of which the lateral position of the recorded pattern 30 is determined.

In this, the recorded image section is selected in such a way that always only a part of the pattern 30 is detected and evaluated. For that reason, a wide light source is arranged as measuring object 11 which projects laterally beyond the image section. Favourably, the pattern 30 is arranged in an area of the light source which is not shadowed by the central measuring object 14. In this, it can also be useful to arrange several cameras 12 in order to adapt the recording area 19. This also goes for other variants of embodiment of the invention.

The central measuring object 14 also may have a characteristic pattern 30 for detection of a position change. For example, geometric shapes are stamped into the measuring object 14 designed as a sheet metal part, so that the light source of the front measuring object 11 shines through. This can be so-called fiducial markers which can be identified by means of pattern recognition and image evaluation.

If both measuring objects 11, 14 have a characteristic pattern 30, unintended swivelling motions of the camera 12 can be recognized immediately. That is because the measuring objects 11, 14 move in the same direction, taking into account the distance relationship. Such an evaluation is then not interpreted as motion of the measuring objects 11, 14, but as a swivelling motion of the camera 12.

Other undesired interferences, like vibrations, can be filtered out with a correspondingly high frame rate. In this, the frame rate must be so high that the motions, occurring as a result of the vibrations, of the objects recorded in the images are transparent. In addition, it may be useful to provide a camera system with integrated image stabilization.

In another embodiment, the central measuring object 14 is configured having self-luminous elements. In this, for example, light-emitting diodes are arranged in a characteristic way which can be detected well by means of the camera 12. This enhances the image recognition under difficult ambient conditions, for example at night or in the case of heavy dust formation.

Figure 9:
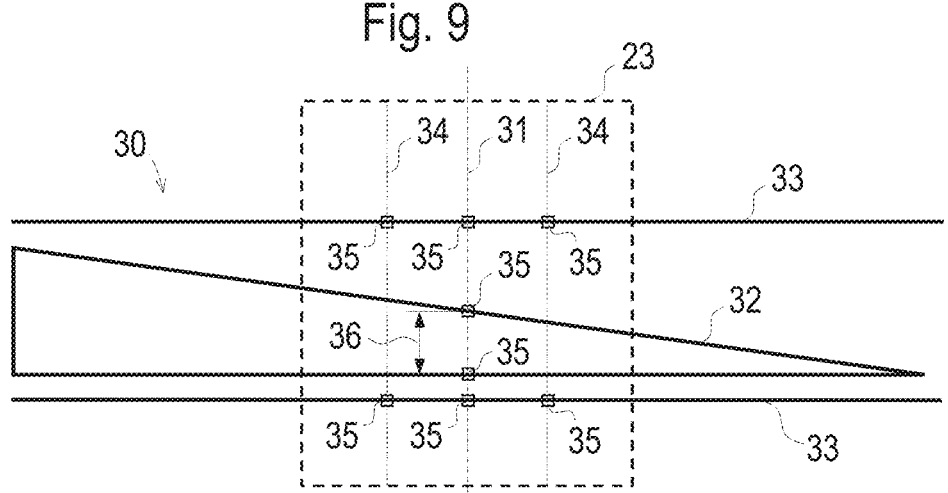
Figure 10:
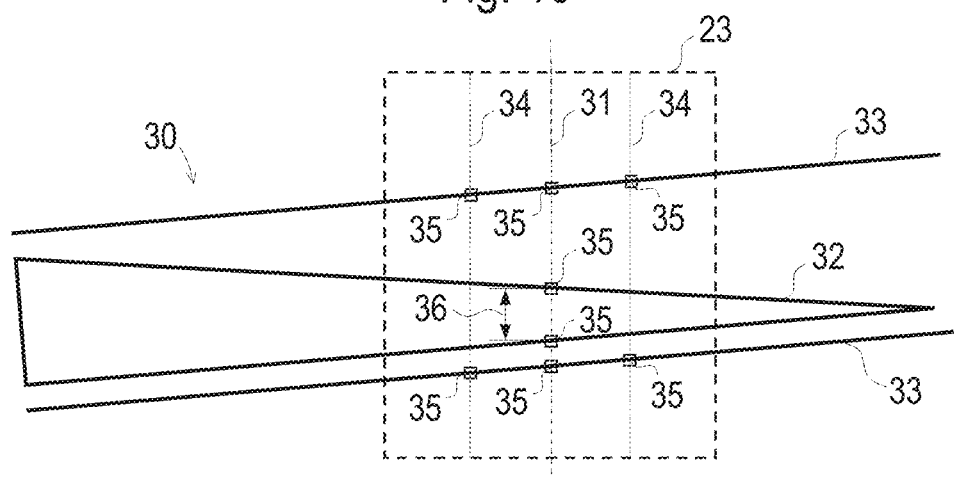

A simple evaluation is present if the characteristic pattern 30 has a triangle 32 (FIGS. 9, 10). In this, in a neutral position of the system, one side of the triangle 32 is oriented horizontally. Above and below the triangle 32, horizontal lines 33 are additionally arranged to detect a tilting of the pattern 30.

Detection of the pattern 30 is described with reference to FIGS. 9 and 10. In this, the edge of the image 23 recorded by the camera 12 is shown in dashed lines. In the middle of the image 23, the central evaluation line 31 is arranged. Further evaluation lines 34 are provided to the left and right thereof. The evaluation lines 31, 34 are used for pattern recognition in that, by means of a suitable image evaluation software, intersection points of these evaluation lines 31, 34 with edges of the triangle 32 and with lines 33 are searched. Recognized points 35 are indicated in the FIGS. 9 and 10 by small squares.

Such a representation serves not only for further image evaluation, but also for adjustment of the system by operating personnel. To that end, the computer is connected to a control panel and a monitor. In addition, further programs are implemented in the computer besides the pattern recognition and image evaluation software. For example, the detected position coordinates of the measuring points 16 are processed for machine control and stored in a data memory for archiving and documentation.

On the basis of the recognized points 35, a height 36 of the triangle 32 is determined and stored as a characteristic value for the present lateral position of the pattern 30. A corresponding evaluation scheme is realized in the pattern recognition and image evaluation software. Other shapes such as diamonds or trapezes are also suitable for the evaluation method.

For determining a position change of the pattern 30, a pattern recognition and image evaluation takes place again in an updated image 23 (FIG. 10). A tilting of the pattern 30 shows up on the basis of the points 35 recognized along the parallel lines 30. With this it is also possible to convert the detected height 36 of the triangle 32 to a value which corresponds to the non-tilted triangle 32. This value is representative of the updated lateral position of the pattern 30.

The discussed embodiments represent only a few of the variants covered by the invention. For example, in a further variant of the invention, more than two measuring objects 11, 14 are arranged to record further position data. With three measuring objects, a so-called four-point measurement can be carried out, wherein the coordinates of the measuring objects and the camera 12 are evaluated. For example, two shadowing objects and a positionally detected light source or three shadowing objects are arranged. With this in particular, sinking of the track 3 can be detected.

Figure 11:
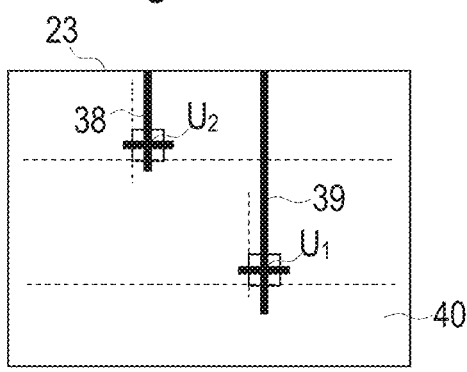
Figure 12:
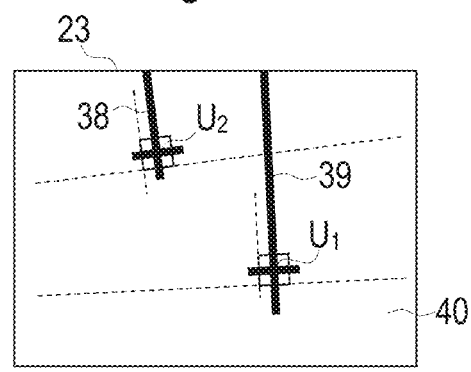

FIGS. 11 and 12 show images 23 of two measuring objects 11, 14, designed as shadowing objects, which stand out as pattern 38, 39 from a background illumination 40. To that end, a light source is arranged behind the two shadowing objects, as seen from the camera 12. This light source does not need to have characteristic features for pattern recognition.

Only the shadowing objects have a characteristic shape, wherein one shadowing object can be attached directly on a luminous surface of the light source. Both shadowing objects may also be arranged at a distance from the light source, wherein the distances between the shadowing objects and the camera 12 are used for position determination.

In FIG. 11, a neutral position of the shadowing objects is shown. Each shadowing object produces a cross-shaped pattern 38, 39. The positions of the coordinate origins $U_1$, $U_2$ and the orientation of the crosses are recognized by means of pattern recognition. In the case of a change in position, the changed positions of the coordinate origins $U_1$, $U_2$ and the changed orientation of the crosses are recognized, and a computation of the new coordinates of the measuring objects 11, 14 takes place.

The invention claimed is:

1. A system for surveying a track, the system comprising:
    two outer measuring devices disposed outwardly relative to a longitudinal direction of the track;
    a central measuring device disposed between said two outer measuring devices;
    each of said measuring devices occupying a specific position relative to the track for detecting geometric track parameters;
    one of said two outer measuring devices including a camera with a recording area;
    another of said two outer measuring devices having a measuring object disposed in said recording area;
    said central measuring device having a measuring object disposed in said recording area; and
    an evaluation device connected to said camera for pattern recognition; and
    said evaluation device being a computer with a pattern recognition and image evaluation software configured for recognizing the measuring objects and determining the position of the measuring objects relative to one another and with respect to an image section of the camera during movement of the system along the track.

2. The system according to claim 1, wherein said measuring object of said other outer measuring device is a light source, and said measuring object of said central measuring device is a shadowing object shadowing a part of said light source against said camera.

3. The system according to claim 1, which further comprises a light source, said measuring object of said another of said two outer measuring devices and said measuring object of said central measuring device being shadowing objects each shadowing a respective part of said light source against said camera.

4. The system according to claim 1, which further comprises a further measuring object disposed in said recording area (19) of said camera.

5. The system according to claim 1, wherein at least one of said measuring objects includes luminescent elements.

6. The system according to claim 1, wherein at least one of said measuring devices has a mount, and at least one of said measuring objects or said camera is at least one of displaceable or pivotable in said mount of said measuring device associated with said measuring object or camera.

7. The system according to claim 1, which further comprises a measuring trolley being moveable on the track, said measuring objects and said camera all being disposed on said measuring trolley.

8. The system according to claim 1, which further comprises a track maintenance machine on which said measuring devices are disposed.

9. The system according to claim 8, which further comprises a position measuring system associated with at least one of said measuring devices, said position measuring system being configured to determine a position relative to the track.

10. A method of operating a system for surveying a track, the method comprising the following steps:

providing two outer measuring devices disposed outwardly relative to a longitudinal direction of the track and a central measuring device disposed between the two outer measuring devices;

placing each of the measuring devices in a specific position relative to the track for detecting geometric track parameters;

providing one of the two outer measuring devices with a camera having a recording area;

providing another of the two outer measuring devices with a measuring object disposed in the recording area;

providing the central measuring device with a measuring object disposed in the recording area;

moving the system along the track; and using an evaluation device connected to the camera for determining changes in position of the measuring objects during movement of the system along the track by evaluating images of the measuring objects recorded by the camera through pattern recognition.

11. The method according to claim 10, which further comprises specifying a characteristic vibration frequency for the system, and specifying a frame rate for the camera being at least double the characteristic vibration frequency.

12. The method according to claim 10, which further comprises at least one of displacing or swivelling at least one of the measuring objects or the camera during travel in a curve.

13. The method according to claim 10, which further comprises using the camera to record a pattern affixed to a measuring object, and changing an image of the pattern in a characteristic way when a position of the pattern changes.

14. The method according to claim 10, which further comprises providing a track maintenance machine on which the measuring devices are disposed, and controlling a working unit of the track maintenance machine in dependence on the detected position of a measuring object.

15. The method according to claim 10, which further comprises using a position measuring system to detect at least the position of one of the measuring objects or the camera relative to the track in a contact-free manner.

* * * * *